US012639280B2

(12) United States Patent
Sharma et al.

(10) Patent No.: US 12,639,280 B2
(45) Date of Patent: May 26, 2026

(54) GENERATING PROMPT EXAMPLES FOR EXTRACTING ENTITIES FROM DOCUMENTS

(71) Applicant: S&P Global Inc., New York, NY (US)

(72) Inventors: Shreyansh Sharma, Leiden (NL); Vishal Minhas, Gurugram (IN)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 18/935,970

(22) Filed: Nov. 4, 2024

(65) Prior Publication Data

US 2026/0127152 A1      May 7, 2026

(51) Int. Cl.
*G06F 16/22*          (2019.01)
*G06F 40/169*         (2020.01)
(52) U.S. Cl.
CPC ........ *G06F 16/2237* (2019.01); *G06F 40/169* (2020.01)
(58) Field of Classification Search
None
See application file for complete search history.

(56) References Cited

U.S. PATENT DOCUMENTS 12,299,081 B1 *   5/2025   Asi ....................... G06F 16/345
2018/0373952 A1 * 12/2018  Bui ....................... G06V 30/153
2021/0192126 A1 *  6/2021  Gehrmann ............... G06N 3/09

OTHER PUBLICATIONS

Nikita Pavlichenk; Best Prompts for Text-to-Image Models and How to Find Them; 2023; pp. 2067-2071.*

* cited by examiner

*Primary Examiner* — Ann J Lo
*Assistant Examiner* — Jermaine A Mincey
(74) *Attorney, Agent, or Firm* — Yee & Associates, P.C.

(57)          ABSTRACT
An illustrative embodiment provides a computer-implemented method. The method comprises using a processor set to receive a number of documents from a plurality of data sources. The processor set annotates entities in the first subset of documents from the number of documents. The processor set splits the number of documents into a number of chunks. The processor sets indexes the number of chunks according to an index structure to generate a number of indexed chunks. The processor set generates a number of prompt examples for each document in the second subset of documents based on the number of indexed chunks and annotated entities from the first subset of documents. The processor set generates a prompt for extracting entities using a large language model based on the number of prompt examples.

17 Claims, 9 Drawing Sheets

300

```
{
    "document_id": "<unique_id>",
    "text": "<chunk_text>",
    "metadata": {
        "entities": ["<entity1>", "<entity2>"],
        "annotated": true,
        "annotated_text": "<chunk_text_with_entities>"
    },
    "embedding": "<chunk_embedding>"
}
```

302 chunk_text: "The capital of France is Paris."
annotated_text: "The capital of @country@France## is @city@Paris##."

400

```
def create_examples(test_doc_id):
    # fetch the test document chunks from the index
    test_doc_chunks = fetch_document(test_doc_id)

# retrieve similar documents from the index
    similar_docs = retrieve_similar_documents(test_doc_chunks)

# for each entity for the document type create examples
    examples = {}
    for entity in entities:
        # retrieve annotated chunks for the entity using similar documents as
first preference
        annotated_chunks = retrieve_annotated_chunks(similar_docs, entity)

# Now find chunks from the test document with the highest similarity to
the annotated chunks, this helps reducing the number of prompts to the LLM
(localization step)
        chunks_of_interest = find_similar_chunks(annotated_chunks)

# create examples using the chunks of interest
        examples[entity] = create_example(chunks_of_interest)

# also drop duplicate chunks of interest being used for multiple entities
    examples = drop_duplicates(examples)

return examples
```

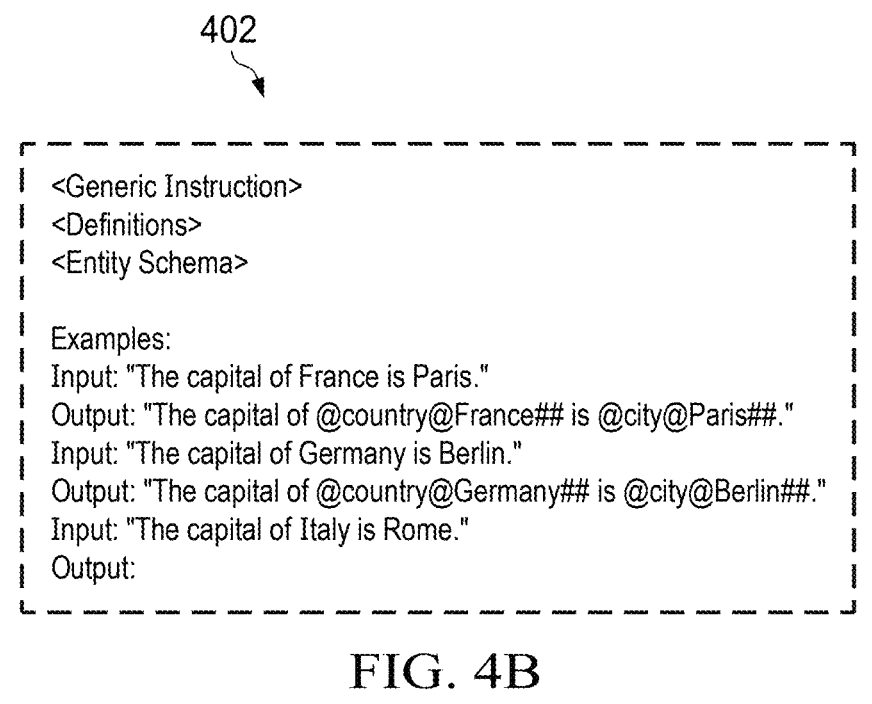

<Generic Instruction>
<Definitions>
<Entity Schema>

Examples:
Input: "The capital of France is Paris."
Output: "The capital of @country@France## is @city@Paris##."
Input: "The capital of Germany is Berlin."
Output: "The capital of @country@Germany## is @city@Berlin##."
Input: "The capital of Italy is Rome."
Output:

FIG. 4B

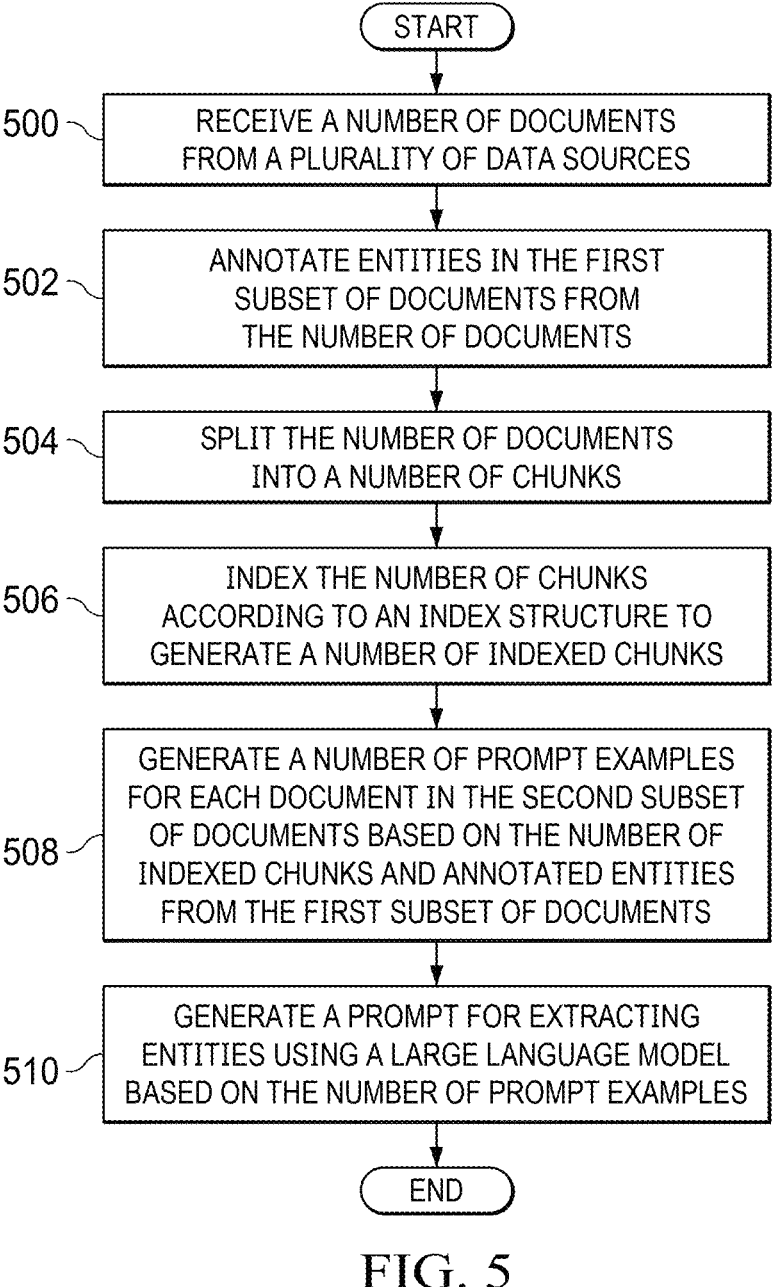

START

500 — RECEIVE A NUMBER OF DOCUMENTS FROM A PLURALITY OF DATA SOURCES

502 — ANNOTATE ENTITIES IN THE FIRST SUBSET OF DOCUMENTS FROM THE NUMBER OF DOCUMENTS

504 — SPLIT THE NUMBER OF DOCUMENTS INTO A NUMBER OF CHUNKS

506 — INDEX THE NUMBER OF CHUNKS ACCORDING TO AN INDEX STRUCTURE TO GENERATE A NUMBER OF INDEXED CHUNKS

508 — GENERATE A NUMBER OF PROMPT EXAMPLES FOR EACH DOCUMENT IN THE SECOND SUBSET OF DOCUMENTS BASED ON THE NUMBER OF INDEXED CHUNKS AND ANNOTATED ENTITIES FROM THE FIRST SUBSET OF DOCUMENTS

510 — GENERATE A PROMPT FOR EXTRACTING ENTITIES USING A LARGE LANGUAGE MODEL BASED ON THE NUMBER OF PROMPT EXAMPLES

END

FIG. 5

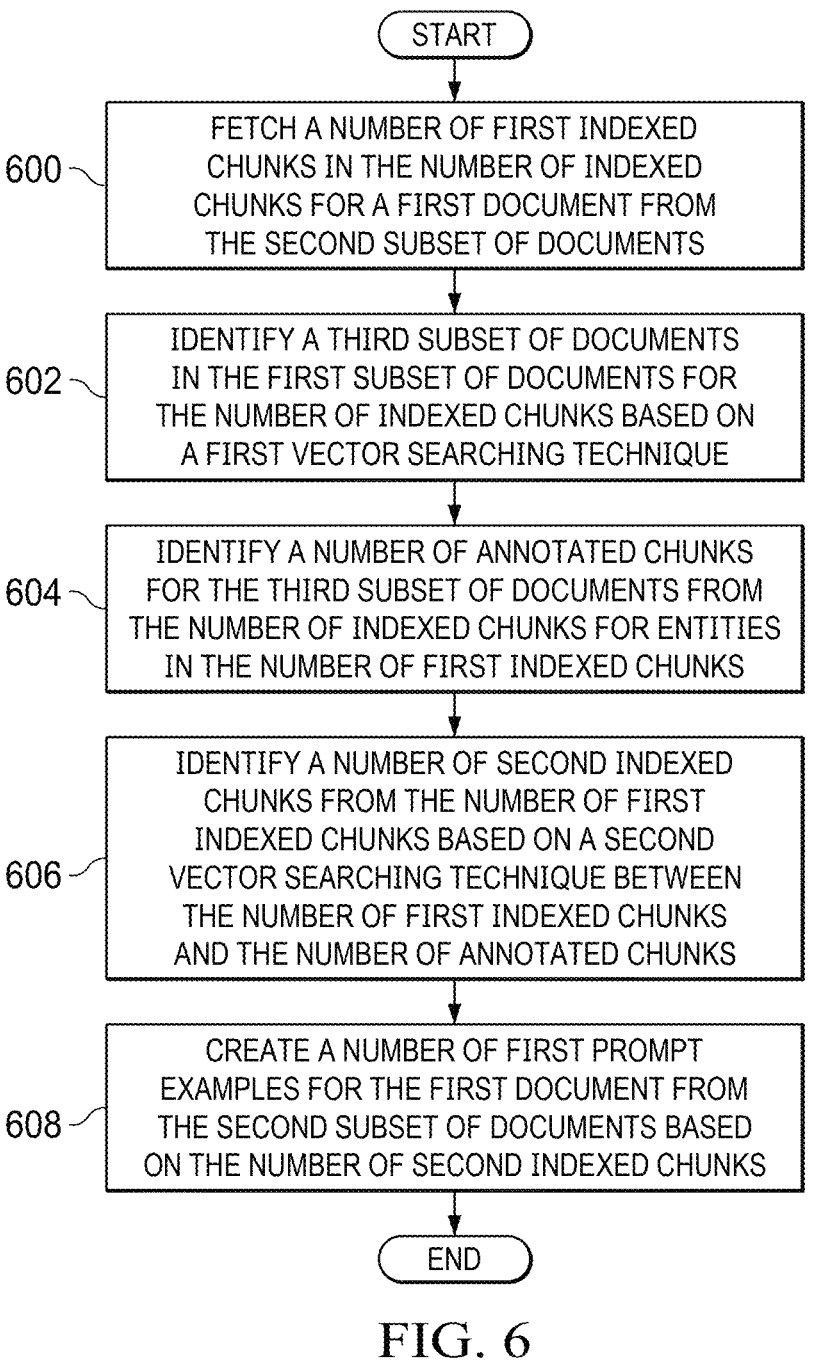

600 — FETCH A NUMBER OF FIRST INDEXED CHUNKS IN THE NUMBER OF INDEXED CHUNKS FOR A FIRST DOCUMENT FROM THE SECOND SUBSET OF DOCUMENTS

602 — IDENTIFY A THIRD SUBSET OF DOCUMENTS IN THE FIRST SUBSET OF DOCUMENTS FOR THE NUMBER OF INDEXED CHUNKS BASED ON A FIRST VECTOR SEARCHING TECHNIQUE

604 — IDENTIFY A NUMBER OF ANNOTATED CHUNKS FOR THE THIRD SUBSET OF DOCUMENTS FROM THE NUMBER OF INDEXED CHUNKS FOR ENTITIES IN THE NUMBER OF FIRST INDEXED CHUNKS

606 — IDENTIFY A NUMBER OF SECOND INDEXED CHUNKS FROM THE NUMBER OF FIRST INDEXED CHUNKS BASED ON A SECOND VECTOR SEARCHING TECHNIQUE BETWEEN THE NUMBER OF FIRST INDEXED CHUNKS AND THE NUMBER OF ANNOTATED CHUNKS

608 — CREATE A NUMBER OF FIRST PROMPT EXAMPLES FOR THE FIRST DOCUMENT FROM THE SECOND SUBSET OF DOCUMENTS BASED ON THE NUMBER OF SECOND INDEXED CHUNKS

FIG. 6

GENERATING PROMPT EXAMPLES FOR EXTRACTING ENTITIES FROM DOCUMENTS

BACKGROUND INFORMATION

1. Field

The present disclosure relates generally to generating prompt examples, and more specifically to generating prompt examples for extracting entities from documents.

2. Background

Prompts refer to the input text or questions provided to a deep learning model such as a large language model to generate a response. A prompt serves as a starting point for the model's processing and can be as simple as a word, a phrase, or as complex as detailed instructions or questions.

In this case, prompts are critical in guiding how deep learning models such as large language models generate content because the prompts set the context and define the scope of the response. In other words, large language models rely heavily on the prompts to interpret user intent and users can ensure that the large language models produce results that are useful by clearly framing questions or instructions in the prompts.

SUMMARY

An illustrative embodiment provides a computer-implemented method. The method comprises using a processor set to receive a number of documents from a plurality of data sources. The number of documents comprises a first subset of documents and a second subset of documents. The processor set annotates entities in the first subset of documents from the number of documents. The processor set splits the number of documents into a number of chunks. Each chunk from the number of chunks comprises a portion of textual information from a document in the number of documents. The processor sets indexes the number of chunks according to an index structure to generate a number of indexed chunks. Chunks with annotated text from the first subset of documents are indexed according to the index structure. The processor set generates a number of prompt examples for each document in the second subset of documents based on the number of indexed chunks and annotated entities from the first subset of documents. The processor set generates a prompt for extracting entities using a large language model based on the number of prompt examples.

Another illustrative embodiment provides a computer system. The system comprises a processor set, a set of one or more computer-readable storage media, and program instructions stored on the set of one or more storage media to cause the processor set to perform operations comprising receiving a number of documents from a plurality of data sources; annotating entities in the first subset of documents from the number of documents. The number of documents comprises a first subset of documents and a second subset of documents. The processor set annotates entities in the first subset of documents from the number of documents. The processor set splits the number of documents into a number of chunks. Each chunk from the number of chunks comprises a portion of textual information from a document in the number of documents. The processor sets indexes the number of chunks according to an index structure to generate a number of indexed chunks. Chunks with annotated text from the first subset of documents are indexed according to the index structure. The processor set generates a number of prompt examples for each document in the second subset of documents based on the number of indexed chunks and annotated entities from the first subset of documents. The processor set generates a prompt for extracting entities using a large language model based on the number of prompt examples.

Another illustrative embodiment provides a computer program product. The computer program product comprises a set of one or more computer-readable storage media, and program instructions stored in the set of one or more storage media to perform operations comprising using a processor set to receive a number of documents from a plurality of data sources; annotating entities in the first subset of documents from the number of documents. The number of documents comprises a first subset of documents and a second subset of documents. The processor set annotates entities in the first subset of documents from the number of documents. The processor set splits the number of documents into a number of chunks. Each chunk from the number of chunks comprises a portion of textual information from a document in the number of documents. The processor sets indexes the number of chunks according to an index structure to generate a number of indexed chunks. Chunks with annotated text from the first subset of documents are indexed according to the index structure. The processor set generates a number of prompt examples for each document in the second subset of documents based on the number of indexed chunks and annotated entities from the first subset of documents. The processor set generates a prompt for extracting entities using a large language model based on the number of prompt examples.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4A depicts an exemplary program instruction for generating prompt examples in accordance with an illustrative embodiment;

FIG. 4B depicts an exemplary prompt in accordance with an illustrative embodiment;

FIG. 5 depicts a flowchart illustrating a process for generating prompt examples in accordance with an illustrative embodiment;

3

Figure 7:
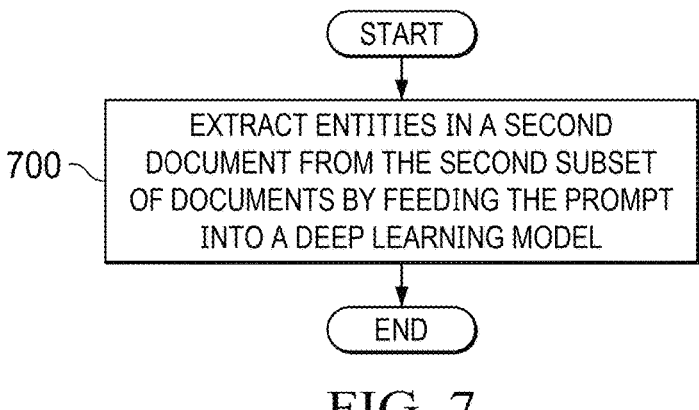
Figure 8:
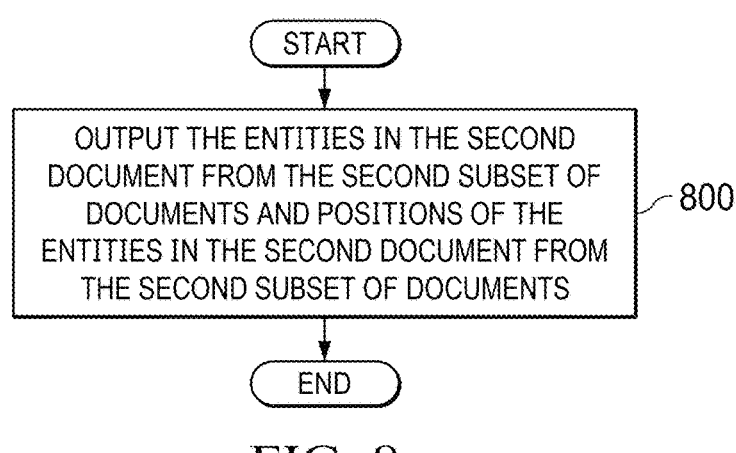
Figure 9:
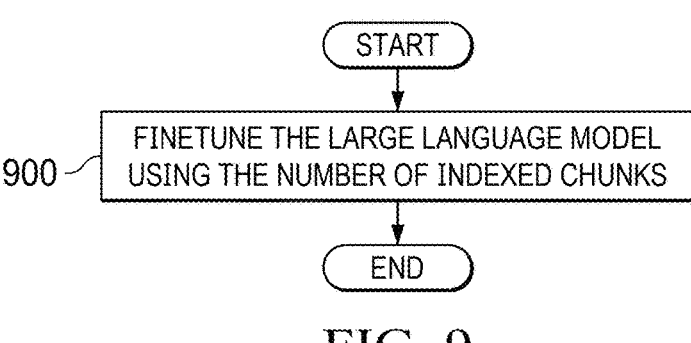
Figure 10:
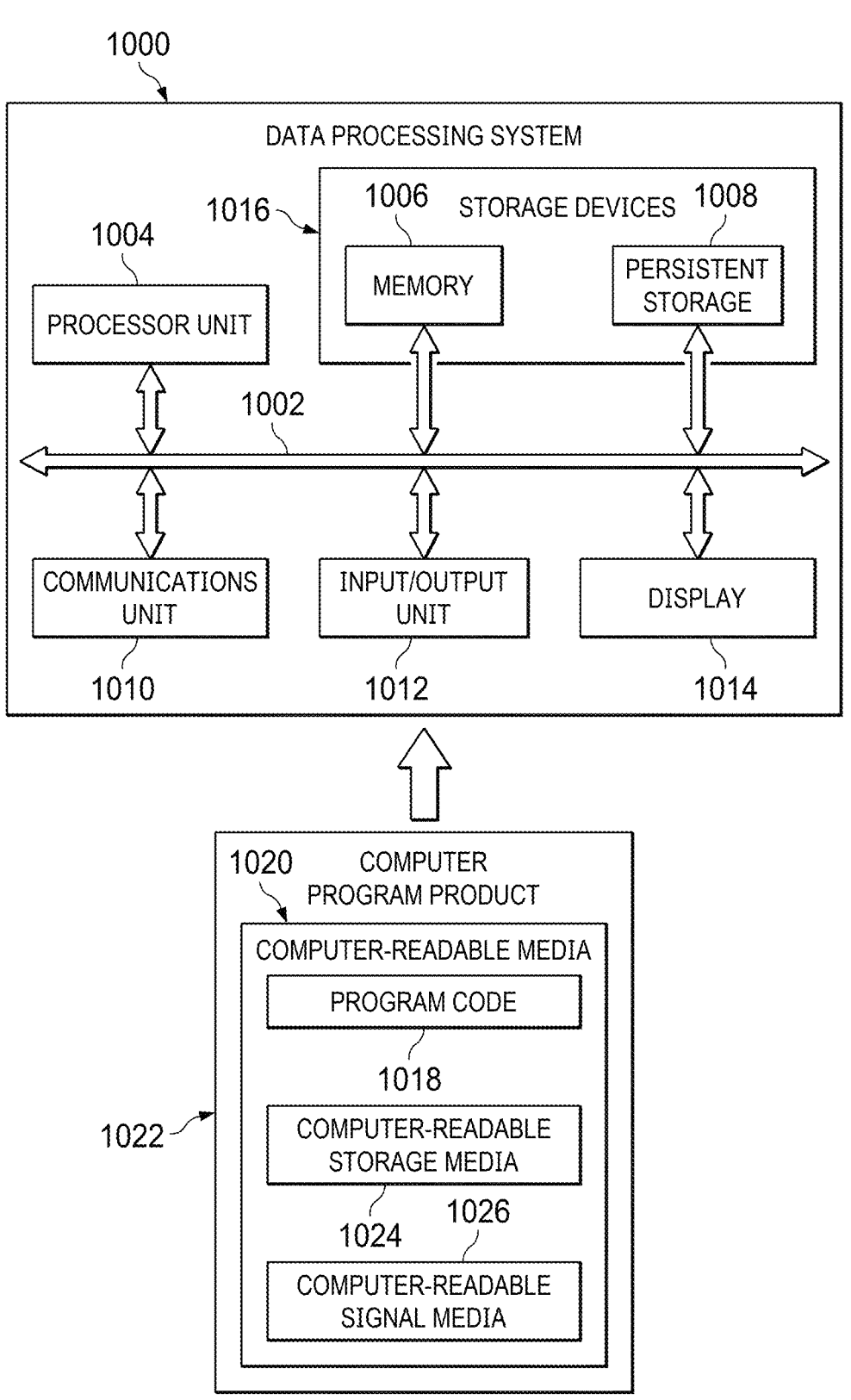

FIG. 6 depicts a flowchart illustrating a process for generating prompt examples in accordance with an illustrative embodiment;

FIG. 7 depicts a flowchart illustrating a process for extracting entities in documents in accordance with an illustrative embodiment;

FIG. 8 depicts a flowchart illustrating a process for outputting entities extracted in documents in accordance with an illustrative embodiment;

FIG. 9 depicts a flowchart illustrating a process for finetuning the large language model in accordance with an illustrative embodiment;

FIG. 10 is a block diagram of a data processing system in accordance with an illustrative embodiment.

DETAILED DESCRIPTION

The illustrative embodiments recognize and take into account a number of considerations. For example, the illustrative embodiments recognize and take into account that named entity recognition is a task of extracting information that seeks to locate and classify named entities. The illustrative embodiments recognize and take into account that named entity recognition is a challenging task that traditionally requires a large amount of labeled training data to achieve high performance.

The illustrative embodiments recognize and take into account that few-shot learning is a type of machine learning that has the ability to train a machine learning model to recognize named entities with only a few examples for each entity.

The illustrative embodiments also recognize and take into account that a Large Language Model-Retrieval Augmented Generation (LLM-RAG) is a technique that combines the power of large language models with retrieval-based methods to generate high-quality text. LLM-RAG models can be fined-tuned on a small amount of data and can generate text that is coherent and contextually relevant.

Thus, illustrative embodiments of the present invention provide a computer implemented method, computer system, and computer program product for generating a model for extracting entities from a document. The method comprises using a processor set to receive a number of documents from a plurality of data sources. The number of documents comprises a first subset of documents and a second subset of documents. The processor set annotates entities in the first subset of documents from the number of documents. The processor set splits the number of documents into a number of chunks. Each chunk from the number of chunks comprises a portion of textual information from a document in the number of documents. The processor set indexes the number of chunks according to an index structure to generate a number of indexed chunks. Chunks with annotated text from the first subset of documents are indexed according to the index structure. The processor set generates a number of prompt examples for each document in the second subset of documents based on the number of indexed chunks and annotated entities from the first subset of documents. The processor set generates a prompt for extracting entities using a large language model based on the number of prompt examples.

Figure 1:
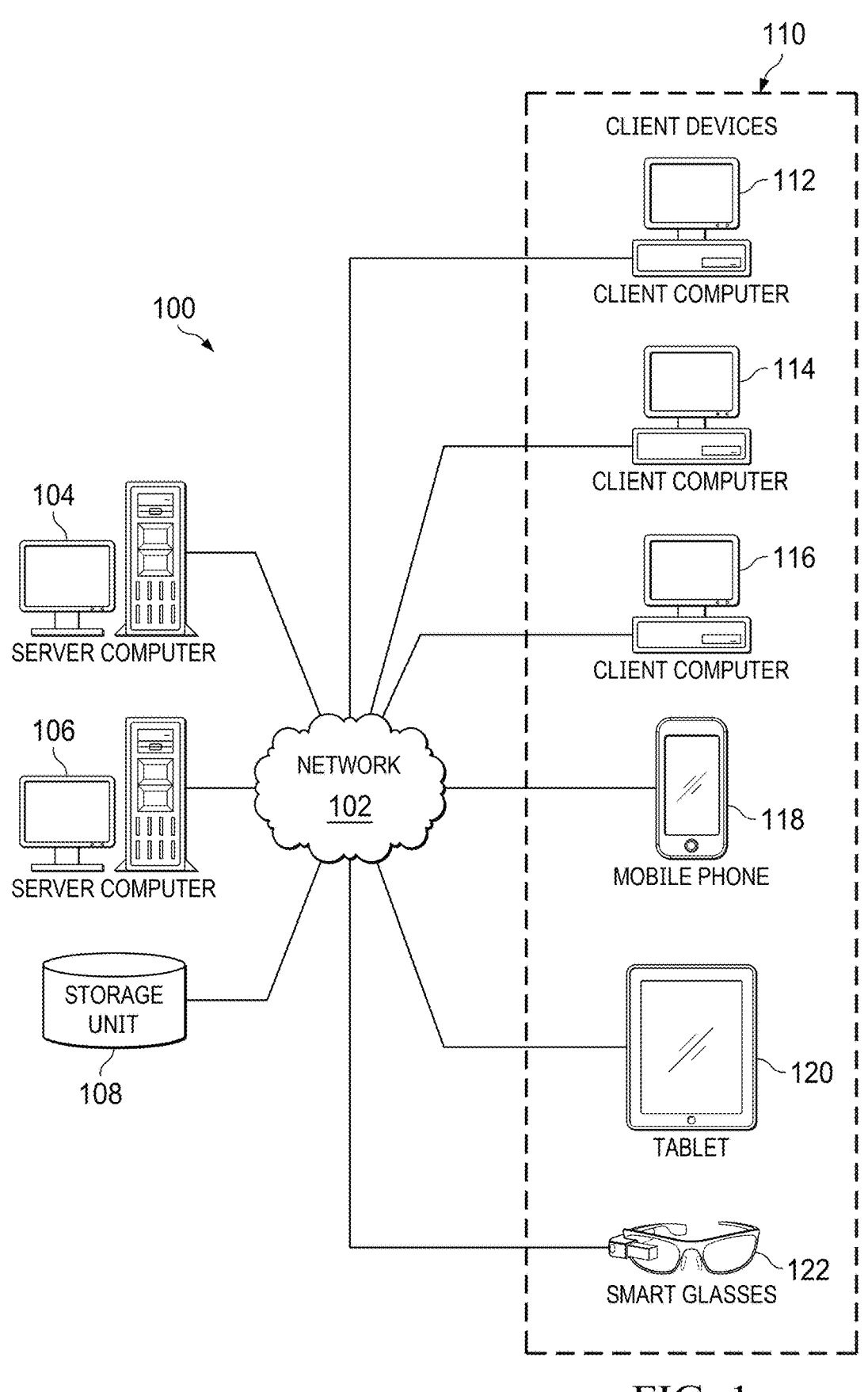
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
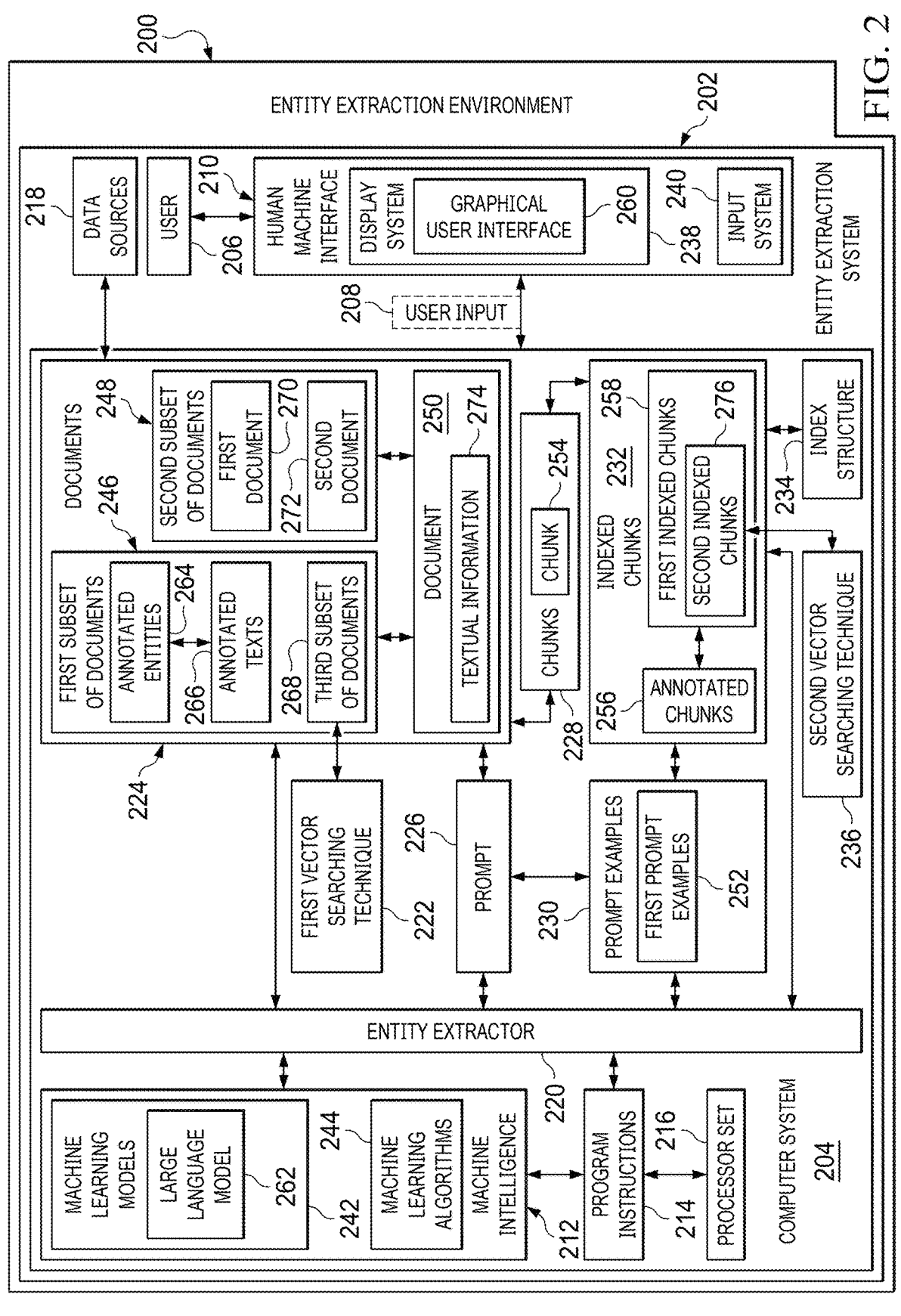
FIG. 2 depicts a block diagram of an entity extraction environment in accordance with an illustrative embodiment.

With reference now to FIG. 2, an illustration of a block diagram of an entity extraction environment is depicted in accordance with an illustrative embodiment. In this illustrative example, entity extraction environment 200 includes components that can be implemented in hardware such as the hardware shown in network data processing system 100 in FIG. 1.

In this illustrative example, entity extraction system 202 in entity extraction environment 200 extracts named entities from documents 224 using machine intelligence 212. In this illustrative example, entity extraction system 202 includes computer system 204 which includes entity extractor 220. Entity extractor 220 is located in computer system 204.

Entity extractor 220 can be implemented in software, hardware, firmware, or a combination thereof. When software is used, the operations performed by entity extractor 220 can be implemented in program instructions configured to run on hardware, such as a processor unit. When firmware is used, the operations performed by entity extractor 220 can be implemented in program instructions and data and stored in persistent memory to run on a processor unit. When hardware is employed, the hardware can include circuits that operate to perform the operations in entity extractor 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 216 in FIG. 2. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, computer system 204 includes machine intelligence 212. Machine intelligence 212 can include machine learning models 242 and machine learning algorithms 244. Machine learning models 242 is a branch of artificial intelligence (AI) that enables computers to detect patterns and improve performance without direct programming commands. Rather than relying on direct input commands to complete a task, machine learning models 242 relies on input data. The data is fed into the machine, one of machine learning algorithms 244 is selected, parameters for the data are configured, and the machine is instructed to find patterns in the input data through optimization algorithms. The data model formed from analyzing the data is then used to predict future values.

Machine intelligence 212 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 212.

Machine intelligence 212 can be implemented using one or more systems such as an artificial intelligence system, a neural network, a generative neural network, a Bayesian network, an expert system, a fuzzy logic system, a genetic algorithm, or other suitable types of systems. Machine learning models 244 and machine learning algorithms 244 may make computer system 204 a special purpose computer for extracting entities from documents 224.

Machine learning models 242 involves using machine learning algorithms 244 to build computation models based on samples of data. The samples of data used for training are referred to as training data or training datasets. Machine intelligence 212 can make predictions without being explicitly programmed to make these predictions. Machine intelligence 212 can be used for training and retraining computation models for a number of different types of applications. These applications include, for example, medicine, financial services, healthcare, speech recognition, computer vision, or other types of applications.

In this illustrative example, machine learning models 242 can include a number of models. For example, machine learning models 242 can include a deep learning model such as large language model 262. In this illustrative example, large language model 262 is a type of machine learning model designed to understand, generate, and manipulate human language.

In this illustrative example, machine learning algorithms 244 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest.

In this illustrative example, computer system 204 includes documents 224 received from data sources 218. In this illustrative example, data sources 218 are locations or platforms from which data is collected, gathered,, or generated for analysis, processing, or storage. For example, data sources 218 can be external databases that are used for storing documents 224. In this illustrative example, optical character recognition is used on documents 224 to convert images or scanned documents into text.

In this illustrative example, documents 224 further includes first subset of documents 246 and second subset of documents 248. Documents 224 include a number of entities. Entities are pieces of information that can be extracted from documents 224. For example, entities can be tables, sections, people, organizations, locations, addresses, dates, or quantities. In this illustrative example, entities can also be referred to as named entities.

In this illustrative example, documents in documents 224 can also have document types. In this illustrative example, entity extractor 220 creates a new document type when a new business requirement is received. For example, document types can include W8bene, W9, Loan Prospectus, or Credit Agreements. In other words, document types are classifications of documents that are associated with specific entities and structures to present those specific entities.

In this illustrative example, entities in first subset of documents 246 are annotated to generate annotated entities 264 and annotated texts 266. In this illustrative example, annotation of entities in first subset of documents 246 can be achieved in a number of ways. For example, annotated entities 264 and annotated texts 266 can be generated by manually labelling entities in first subset of documents 246 using special symbols, syntax, or characters. In this illustrative example, annotated texts 266 are portions of text that included annotated information such as annotated entities 264.

Entity extractor 220 splits all documents in documents 224 into a number of chunks 228. In this illustrative example, each chunk in chunks 228 include a portion of textual information from a document in documents 224. For example, chunk 254 includes textual information 274 from document 250 in documents 224. It should be understood that each document in documents 224 is split into a number of chunks. In other words, chunks other than chunk 254 may also be corresponded to other textual information in document 250. In this illustrative example, chunks 228 can further be converted into embeddings using a pre-trained language model from machine learning models 242.

In this illustrative example, entity extractor 220 indexes chunks 228 or embeddings of chunks 228 according to index structure 234 to generate indexed chunks 232. Index structure 234 is an organization of data such that data indexed according to index structure 234 can be stored to facilitate fast search, retrieval, and access in database or other data systems.

In addition, chunks in chunks 228 that include annotated texts from annotated texts 266 are also indexed according to index structure 234. In this illustrative example, indexed chunks 232 can be stored in a vector database and chunks with annotated texts can be flagged to indicate that those chunks can be used as examples for few-shot learning for machine learning models 242.

As depicted, indexed chunks 232 can be used as training data for training machine learning models 242 such as large language model 262 in machine intelligence 212. In this illustrative example, machine intelligence 212 can utilize few-shot learning to learn how to identify entities from documents 224 based on indexed chunks from indexed chunks 232 that include annotated texts, which include information associated with annotated entities 264 and annotated texts 266 from first subset of documents 246. As a result, large language model 262 can be used for identifying entities for documents 224 after training.

In this illustrative example, entity extractor 220 can generate prompt examples 230 for each document in second subset of documents 248 based on indexed chunks 232 and annotated entities 264 from first subset of documents 246. In this illustrative example, a number of prompt examples are generated for each document in second subset of documents 248.

Prompt examples 230 can be generated in a number of ways. For example, entity extractor 220 can fetch a number of first indexed chunks 258 for first document 270 from second subset of documents 248. In other words, the number of first indexed chunks 258 include unannotated textual information from first document 270 in second subset of documents 248.

In this illustrative example, entity extractor 220 can use prompt examples 230 to generate synthetic data by replacing entities with different values. For example, entity extractor 220 can utilize existing dictionary based mapping of entities which can be replaced in existing indexes to create variations. Such synthetic data can be used to enrich existing dataset and potentially finetuning machine learning models 242 such as large language model 262 for better accuracy and efficiency.

In this illustrative example, entity extractor 220 can identify third subset of documents 268 from first subset of documents 246 based on first indexed chunks 258 using first vector searching technique 222. In this illustrative example, first vector searching technique 222 is a method used to search data in a vector space.

For example, first vector searching technique 222 can be a similarity analysis such as cosine similarity or Jaccard similarity that can be used for identifying documents with similar chunks. In other words, third subset of documents 268 are documents in first subset of documents 246 that have corresponding chunks that are similar to first indexed chunks 258.

In this illustrative example, annotated chunks 256 are identified for third subset of documents 268 for entities included in first indexed chunks 258. In other words, annotated chunks 256 are chunks that include entities from third subset of documents 268.

Entity extractor 220 can identify a number of second indexed chunks 276 from first indexed chunks 258 based on second vector searching technique 236 that is performed between first indexed chunks 258 and annotated chunks 256. As depicted, second vector searching technique 236 is a method used to search data in a vector space. For example, second vector searching technique 236 can be a similarity analysis such as cosine similarity or Jaccard similarity that can be used for identifying documents with similar chunks.

In this illustrative example, entity extractor 220 can further rank second indexed chunks 276 based on scores obtained from second vector searching technique 236. In this example, entity extractor 220 can take the top indexed chunks from second indexed chunks 276 for further processing.

As a result, entity extractor 220 can generate first prompt examples 252 for first document 270 according to a prompt structure using second indexed chunks 276 and machine learning models 242. In this illustrative example, each prompt example in prompt examples 230 correspond to an entity in a document of a specific document type. In other words, a number of prompt examples are generated for each entity of each document type.

In this illustrative example, entity extractor 220 can use prompt examples 230 to generate prompts that can be fed into a deep learning model such as large language model 262 to extract entities from other documents. For example, entity extractor 220 can generate prompt 226 using prompt examples 230 to extract entities from second document 272 in second subset of documents 248. In this illustrative example, prompt 226 can include general instructions for large language model 262, and definition as well as entity schema for prompt examples 230 for second document 272.

Entity extractor 220 can further output extracted entities from second document 272 and positions of the extracted entities in second document 272 from second subset of documents 248. In this illustrative example, the entities extracted from second document 272 can be converted into a structured format using machine learning models 242.

In this illustrative example, users such as user 206 can interact with computer system 204 through user inputs to computer system 204. For example, computer system 204 can receive user input 208 that includes annotations for first subset of documents 246 to generate annotated entities 264, program instructions for splitting documents 224 into chunks, index structure 234, and selection of algorithms such as machine learning algorithms 244, first vector searching technique 222, and second vector searching technique 236.

In this illustrative example, user input 208 can be generated by user 206 using human machine interface (HMI) 210. As depicted, human machine interface 210 includes display system 238 and input system 240. Display system 238 is a physical hardware system and includes one or more display devices on which graphical user interface 260 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 260 through user input 208 generated by input system 240. Input system 240 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. For example, user 206 can view documents 224, first subset of documents 246, second subset of documents 248, prompt examples 230, prompt 226, chunks 228, and indexed chunks 232 through graphical user interface 260 in display system 238.

In one illustrative example, one or more solutions are present that overcome a problem with extracting entities from documents. As a result, one or more technical solutions may provide an ability to increase the efficiency for extracting entities in documents in computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which entity extractor 220 in computer system 204 enables extraction of entities in documents. In particular, entity extractor 220 transforms computer system

204 into a special purpose computer system as compared to currently available general computer systems that do not have entity extractor 220.

In the illustrative example, the use of entity extractor 220 in computer system 204 integrates processes into a practical application for extracting entities from documents because entity extractor 220 improves efficiency and accuracy for entity extraction such that performance of computer system 204 can be increased. In other words, entity extractor 220 in computer system 204 is directed to a practical application of processes integrated into entity extractor 220 in computer system 204 that extract entities from documents in an accurate and efficient manner.

The illustration of entity extraction environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, second document 272 can be an existing document in second subset of documents 248 or a new document received from data sources 218. In another example, annotation of first subset of documents 246 can be automated using a zero-shot learning technique, where large language model 262 is used for predicting entities in first subset of documents 246. In yet another example, the entities extracted from second document 272 can be validated using a portion of annotated entities from annotated entities 264.

Figures 3A, 3B:
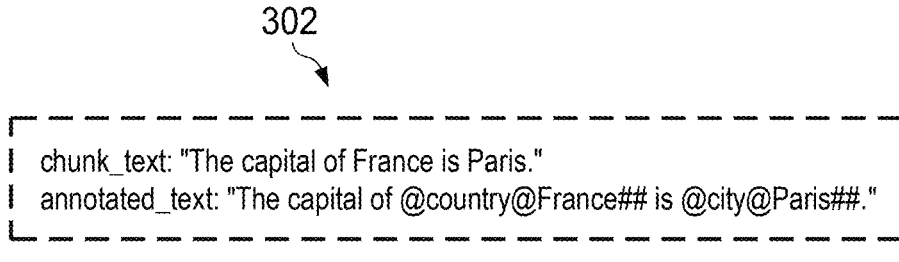
FIG. 3A depicts exemplary index structure in accordance with an illustrative embodiment.
FIG. 3B depicts exemplary chunked text and annotated text in accordance with an illustrative embodiment.

FIG. 3A depicts an exemplary index structure in accordance with an illustrative embodiment. FIG. 3B depicts exemplary chunked text and annotated text in accordance with an illustrative embodiment. In this illustrative example, index structure 300 can be an example of index structure 234 in FIG. 2, chunked text in example 302 can be example of chunks 228 in FIG. 2, and annotated text in example 302 can be example of annotated chunks 256 in FIG. 2.

As depicted, text from documents along with respective entities is split into chunks and those chunks are then converted into embeddings using a pre-trained language model. In this illustrative example, the embeddings are then indexed in a vector database according to index structure 300 for efficient search.

In index structure 300, information associated with the embeddings for the chunks are stored in accordance with index structure 300. For example, index structure 300 includes identifiers for documents, text of the chunks, metadata associated with the chunks, and embeddings for the chunks.

In this illustrative example, the metadata in index structure 300 includes a list of entities present in the chunk and chunks with annotated texts are flagged to represent that they can be used as examples for few-shot learning.

In addition, chunked texts are converted into annotated text by wrapping the entities with special tokens such as symbols, syntax, or characters.

For example, example 302 in FIG. 3B shows a pair of a chunk and an annotated text converted from the text using index structure 300. In this illustrative example, entities such as "country", "France", "city", and "Paris" are identified from the chunk and are annotated with special tokens such as "@" and "#".

With reference now to FIG. 4A, an exemplary program instruction for generating prompt examples is shown in accordance with an illustrative embodiment.

In this illustrative example, program instruction 400 illustrates a method of generating prompt examples as described in FIG. 2. In this case, program instruction 400 fetch chunks for a document using the index and similar documents that are annotated are retrieved from index based on the fetched chunks for the document.

Prompt examples are generated for each entity of each document type for the fetched chunks. In this illustrative example, program instruction 400 retrieves annotated chunks for the similar documents and identifies similar chunks in the fetched chunks based on the retrieved annotated chunks. As a result, program instruction 400 generates prompt examples based on the similar chunks.

In this illustrative example, program instruction 400 can further delete duplicated chunks from the similar chunks such that duplicated chunks used for multiple entities can be deleted to improve efficiency.

With reference now to FIG. 4B, an exemplary prompt is shown in accordance with an illustrative embodiment. In this illustrative example, prompt 402 can be an example of prompt 226 in FIG. 2. In addition, prompt 402 can be generated using prompt examples generated by program instruction 400 in FIG. 4A.

Prompt 402 includes generic instruction, definition, and entity schema, as well as prompt examples that include chunks of text as well as annotations for the chunks of text. For example, entities such as "country", "France", "city", "Paris", "Germany", and "Berlin" are annotated with special tokens such as "@" and "#". In this illustrative example, prompt 402 intend to identify entities from the input of "the capital of Italy is Rome." Using the prompt examples provided.

In this illustrative example, prompt structure and the output format for prompt 402 is designed to account the hallucination issues from large language models. By making the large language models to return the same structure as the input, the chance of hallucination can be reduced and the location of the entities in the output can be attained.

With reference now to FIG. 5, a flowchart illustrating a process for generating prompt examples is shown in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in entity extractor 220 in computer system 204 in FIG. 2.

The process begins by receiving a number of documents from a plurality of data sources (step 500). In step 500, the number of documents comprises a first subset of documents and a second subset of documents. The process annotates entities in the first subset of documents from the number of documents (step 502).

The process splits the number of documents into a number of chunks (step 504). In step 504, each chunk from the number of chunks comprises a portion of textual information from a document in the number of documents. The process indexes the number of chunks according to an index structure to generate a number of indexed chunks (step 506). In this step, chunks with annotated text from the subset of documents are indexed according to the index structure.

The process generates a number of prompt examples for each document in the second subset of documents based on the number of indexed chunks and annotated entities from the first subset of documents (step 508).

The process generates a prompt for extracting entities using a large language model based on the number of prompt examples (step 510). The process terminates thereafter.

With reference now to FIG. 6, a flowchart illustrating a process for generating prompt examples is shown in accordance with an illustrative embodiment. The process in this flowchart is an example of an implementation for step 508 in FIG. 5.

The process begins by fetching a number of first indexed chunks in the number of indexed chunks for a first document from the second subset of documents (step 600). The process identifies a third subset of documents in the first subset of documents for the number of indexed chunks based on a first vector searching technique (step 602).

The process identifies a number of annotated chunks for the third subset of documents from the number of indexed chunks for entities in the number of first indexed chunks (step 604). The process identifies a number of second indexed chunks from the number of first indexed chunks based on a second vector searching technique between the number of first indexed chunks and the number of annotated chunks (step 606). The process creates a number of first prompt examples for the first document from the second subset of documents based on the number of second indexed chunks (step 608). The process terminates thereafter.

With reference now to FIG. 7, a flowchart illustrating a process for extracting entities in documents is shown in accordance with an illustrative embodiment. The process in this figure is an example of an additional step that can be performed with the steps in FIG. 7.

The process begins by extracting entities in a second document from the second subset of documents by feeding the prompt into a deep learning model (step 700). The process terminates thereafter.

With reference now to FIG. 8, a flowchart illustrating a process for outputting entities extracted in documents is shown in accordance with an illustrative embodiment. The process in this figure is an example of an additional step that can be performed with the steps in FIG. 5.

The process begins by outputting the entities in the second document from the second subset of documents and positions of the entities in the second document from the second subset of documents (step 800). The process terminates thereafter.

With reference now to FIG. 9, a flowchart illustrating a process for finetuning large language model is shown in accordance with an illustrative embodiment. The process in this figure is an example of an additional step that can be performed with the steps in FIG. 5.

The process begins by finetuning the large language model using the number of indexed chunks (step 900). The process terminates thereafter.

With reference now to FIG. 10, an illustration of a block diagram of a data processing system is depicted in accordance with an illustrative embodiment. Data processing system 1000 may be used to implement server computer 104 and server computer 106 and client devices 110 in FIG. 1, as well as computer system 204 in FIG. 2. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUS).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for data communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method, comprising:
receiving, by a processor set, a number of documents from a plurality of data sources, wherein the number of documents comprises a first subset of documents and a second subset of documents;
annotating, by the processor set, entities in the first subset of documents from the number of documents;
splitting, by the processor set, the number of documents into a number of chunks, wherein each chunk from the number of chunks comprises a portion of textual information from a document in the number of documents;
indexing, by the processor set, the number of chunks according to an index structure to generate a number of indexed chunks, wherein chunks with annotated text from the first subset of documents are indexed according to the index structure;
fetching, by the processor set, a number of first indexed chunks in the number of indexed chunks for a first document from the second subset of documents;
identifying, by the processor set, a third subset of documents in the first subset of documents for the number of indexed chunks based on a first vector searching technique;
identifying, by the processor set, a number of annotated chunks for the third subset of documents from the number of indexed chunks for entities in the number of first indexed chunks;
identifying, by the processor set, a number of second indexed chunks from the number of first indexed chunks based on a second vector searching technique between the number of first indexed chunks and the number of annotated chunks;
creating, by the processor set, a number of first prompt examples for the first document from the second subset of documents based on the number of second indexed chunks; and
generating, by the processor set, a prompt for extracting entities in the second document from the second subset of documents using a large language model based on a number of prompt examples comprising the number of first prompt examples.

2. The computer implemented method of claim 1, further comprising:
extracting, by the processor set, entities in a second document from the second subset of documents by feeding the prompt into a deep learning model.

3. The computer implemented method of claim 2, further comprising:
outputting, by the processor set, the entities in the second document from the second subset of documents and positions of the entities in the second document from the second subset of documents.

4. The computer implemented method of claim 1, wherein the prompt further comprises general instructions for the large language model, and definitions and entity schema for the number of prompt examples for each document in the second subset of documents.

5. The computer implemented method of claim 1, further comprising:
finetuning, by the processor set, the large language model using the number of indexed chunks.

6. The computer implemented method of claim 1, wherein the number of indexed chunks is stored in a vector database.

7. A computer system, comprising:
a processor set;
a set of one or more computer-readable storage media; and
program instructions stored on the set of one or more storage media to cause the processor set to perform operations comprising:
receiving a number of documents from a plurality of data sources, wherein the number of documents comprises a first subset of documents and a second subset of documents;
annotating entities in the first subset of documents from the number of documents;
splitting the number of documents into a number of chunks, wherein each chunk from the number of chunks comprises a portion of textual information from a document in the number of documents;
indexing the number of chunks according to an index structure to generate a number of indexed chunks, wherein chunks with annotated text from the first subset of documents are indexed according to the index structure;
fetching a number of first indexed chunks in the number of indexed chunks for a first document from the second subset of documents;
identifying a third subset of documents in the first subset of documents for the number of indexed chunks based on a first vector searching technique;
identifying a number of annotated chunks for the third subset of documents from the number of indexed chunks for entities in the number of first indexed chunks;
identifying a number of second indexed chunks from the number of first indexed chunks based on a second vector searching technique between the number of first indexed chunks and the number of annotated chunks;
creating a number of first prompt examples for the first document from the second subset of documents based on the number of second indexed chunks; and
generating a prompt for extracting entities in the second document from the second subset of documents using a large language model based on the number of prompt examples.

8. The computer system of claim 7, wherein the operations further comprise:
extracting entities in a second document from the second subset of documents by feeding the prompt into a deep learning.

9. The computer system of claim 8, wherein the operations further comprise:
outputting the entities in the second document from the second subset of documents and positions of the entities in the second document from the second subset of documents.

10. The computer system of claim 7, wherein the operations further comprise:

finetuning the large language model using the number of indexed chunks.

11. The computer system of claim 7, wherein the number of indexed chunks is stored in a vector database.

12. A computer program product comprising:

a set of one or more computer-readable storage media;

program instructions stored in the set of one or more storage media to perform operations comprising:

receiving, by a processor set, a number of documents from a plurality of data sources, wherein the number of documents comprises a first subset of documents and a second subset of documents;

annotating, by the processor set, entities in the first subset of documents from the number of documents;

splitting, by the processor set, the number of documents into a number of chunks, wherein each chunk from the number of chunks comprises a portion of textual information from a document in the number of documents;

indexing, by the processor set, the number of chunks according to an index structure to generate a number of indexed chunks, wherein chunks with annotated text from the first subset of documents are indexed according to the index structure;

fetching, by the processor set, a number of first indexed chunks in the number of indexed chunks for a first document from the second subset of documents;

identifying, by the processor set, a third subset of documents in the first subset of documents for the number of indexed chunks based on a first vector searching technique;

identifying, by the processor set, a number of annotated chunks for the third subset of documents from the number of indexed chunks for entities in the number of first indexed chunks;

identifying, by the processor set, a number of second indexed chunks from the number of first indexed chunks based on a second vector searching technique between the number of first indexed chunks and the number of annotated chunks;

creating, by the processor set, a number of first prompt examples for the first document from the second subset of documents based on the number of second indexed chunks; and generating, by the processor set, a prompt for extracting entities in the second document from the second subset of documents using a large language model based on the number of prompt examples.

13. The computer program product of claim 12, wherein the operations further comprise:

extracting, by the processor set, entities in a second document from the second subset of documents by feeding the prompt into a deep learning model.

14. The computer program product of claim 13, wherein the operations further comprise:

outputting, by the processor set, the entities in the second document from the second subset of documents and positions of the entities in the second document from the second subset of documents.

15. The computer program product of claim 12, wherein the prompt further comprises general instructions for the large language model, and definitions and entity schema for the number of prompt examples for each document in the second subset of documents.

16. The computer program product of claim 12, wherein the operations further comprise:

finetuning, by the processor set, the large language model using the number of indexed chunks.

17. The computer system of claim 7, wherein the prompt further comprises general instructions for the large language model, and definitions and entity schema for the number of prompt examples for each document in the second subset of documents.

* * * * *